United States Patent [19]
Reimer et al.

[11] Patent Number: 5,472,680
[45] Date of Patent: Dec. 5, 1995

[54] PRODUCTION OF NO FROM $N_2O$

[75] Inventors: Ronald A. Reimer, Orange; Colin S. Slaten, Victoria, both of Tex.

[73] Assignee: E. I. Du Pont de Nemours and Company, Wilmington, Del.

[21] Appl. No.: 186,086

[22] Filed: Jan. 26, 1994

[51] Int. Cl.$^6$ ............................ B01D 53/56; C01B 21/24
[52] U.S. Cl. ........................ 423/405; 423/400; 423/235
[58] Field of Search ............................ 423/239.1, 210, 423/405, 400, 235

[56] References Cited

U.S. PATENT DOCUMENTS 5,133,950   7/1992   Oakes et al. ........................ 423/239.1
5,233,934   8/1993   Krigmont et al. .................... 423/239.1

FOREIGN PATENT DOCUMENTS 555110    8/1993   European Pat. Off. .
257940   11/1986   Japan .

OTHER PUBLICATIONS

Official Translation of Sakamoto, et al., Japanese Kokai No. 61–257,940, first published 15 Nov. 1986.

*Primary Examiner*—Michael Lewis
*Assistant Examiner*—Peter T. DiMauro

[57] ABSTRACT

A Process for the conversion of $N_2O$ to NO by heating a gas stream containing $N_2O$ by contact with a heated heat exchange surface to a temperature of about 400° to 700 degrees C., and then heating the gas to a temperature of about 850 degrees C. while the gas is not in contact with a heated heat exchange surface, and spontaneously and decomposing the $N_2O$ and recovering NO.

7 Claims, 1 Drawing Sheet

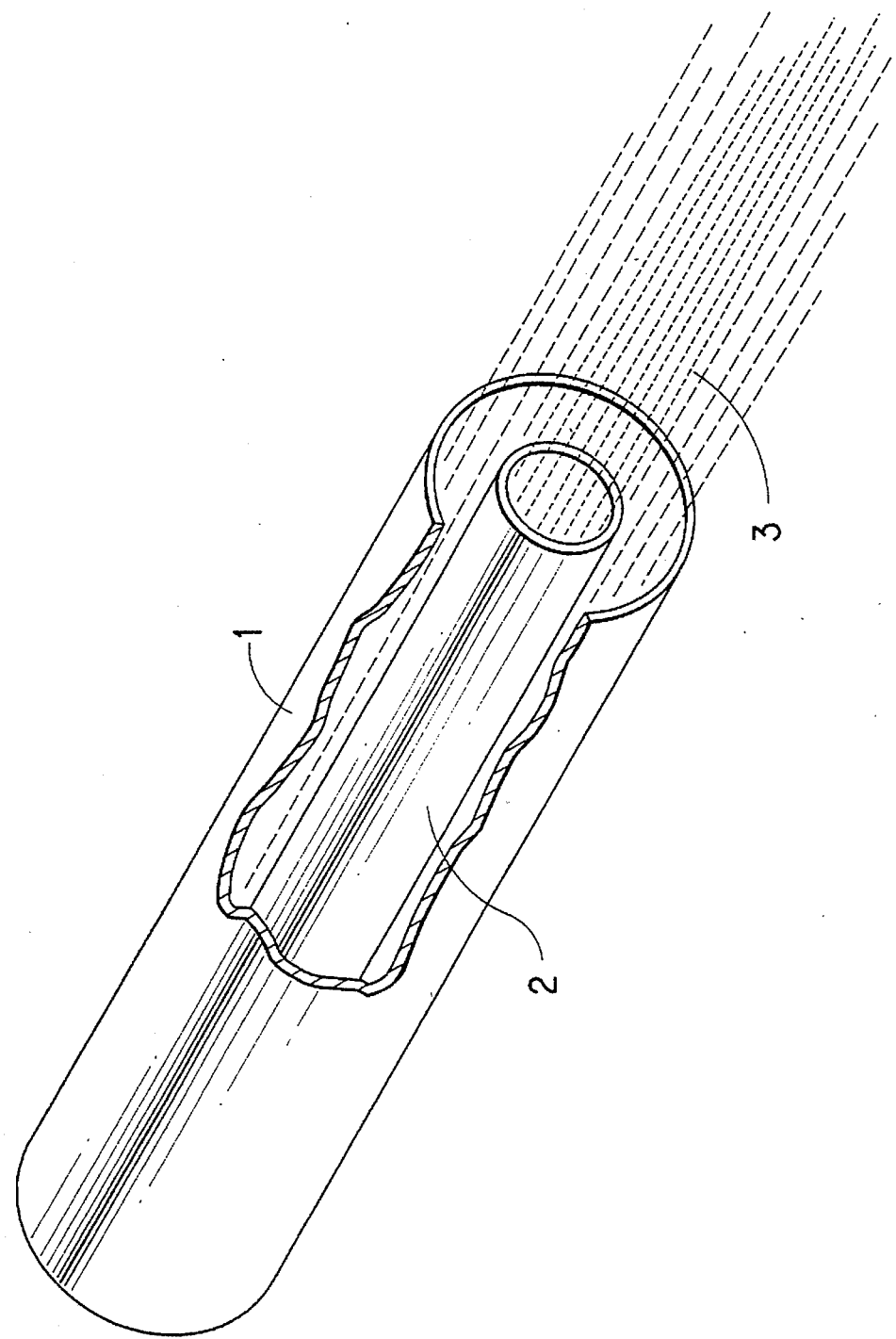

/ 1

PRODUCTION OF NO FROM $N_2O$

FIELD OF THE INVENTION

This invention relates to the conversion of $N_2O$ an ozone depletion gas as well as a global warming gas, to NO. The NO is recovered and converted to $HNO_3$.

BACKGROUND OF THE INVENTION

In a commercial process for the production of adipic acid, cyclohexanone and cyclohexanol are oxidized with nitric acid to form adipic acid. A by-product of the reaction is $N_2O$. $N_2O$ has recently been identified as gas that if released to the atmosphere acts as an ozone depletion gas and as a global warming gas. Efforts are underway in the chemical industry to significantly reduce the amount of $N_2O$ that is released to the atmosphere.

Japanese Patent Application Publication S61-257940 discloses a process for the conversion of off-gas from the production of adipic acid by nitric acid oxidation, wherein the off-gas is heated in a heat exchange unit to raise the temperature sufficiently high that the $N_2O$ decomposes to form NO, nitrogen, and oxygen. The patent application points out that if the reaction were conducted catalytically, then the products of the reaction would be nitrogen and oxygen, but very little NO.

One of the problems with the process described in this Japanese publication is that the heating of the off-gas to reaction temperature by a heat exchanger and the decomposition reaction both take place in the same reactor. Since the decomposition reaction is highly exothermic the temperature in the chamber will exceed about 1000 to 1300 degrees C. Such high temperatures require ceramic equipment or equipment made from very expensive metals.

Burton D. Fine et al in "The Yield of Nitric Oxide from Premixed Flames of Hydrogen and Hydrocarbons with Nitrous Oxide" NASA Technical Note D-1736, 5/63 discloses premixing gases containing $N_2O$ with various fuels and igniting the mixture.

European Patent Application 93400042.3, published Aug. 11, 1993, discloses the conversion of $N_2O$ to NO by injecting dinitrogen oxide either into a flame or into the hot gases issuing from the flame.

The present invention provides an improved process for the decomposition of $N_2O$ contained in an off-gas from nitric acid oxidation to produce adipic acid. The process can be operated in an efficient manner with modestly priced equipment. The stream exiting the reactor is relatively high in NO concentration, and is diluted only minimally by combustion products of the combustible gas used to heat the off-gas to its combustion temperature. When dilution is minimized, the NO yield (moles of NO produced per mole of $N_2O$ fed) is unexpectedly high, and the higher concentration of NO produced can be economically recovered in a commercial absorption tower.

SUMMARY OF THE INVENTION

The present invention is a process for the production and recovery of NO from a gas stream prepared by the decomposition of $N_2O$ contained in a gas stream, which comprises (a) heating a first gas stream containing the $N_2O$ to a temperature between about 400 and 700 degrees C. by contacting said $N_2O$ containing stream with a heated heat-exchange surface, (b) then passing the stream into a zone where it is out of contact with a heated heat-exchange surface while raising the stream temperature to about 850 degrees C., (d) decomposing the $N_2O$ in the stream spontaneously and exothermally to form NO, $N_2$ and $O_2$, while the temperature in the stream is raised to at least about 1000 degrees C., normally about 1000° C. to about 1500° C., (e) rapidly cooling the gas stream now containing NO and (f) recovering the NO formed.

In one of its preferred forms the present invention is a process for the production and recovery of NO from a gas stream prepared by the decomposition of $N_2O$ contained in a gas stream, which comprises (a) heating a first gas stream containing the $N_2O$ to a temperature between about 400 and 700 degrees C. by contacting said $N_2O$ containing stream with a heated heat-exchange surface, (b) combusting a combustible second gas stream, (c) then combining the first and second gas streams in a zone where the combined stream is out of contact with a heated heat-exchange surface, the temperature and volume of the second gas stream being sufficient to raise the temperature of the combined stream to about 850 degrees C., (d) decomposing the $N_2O$ in the combined stream spontaneously and exothermally to form NO, $N_2$ and $O_2$, while the temperature in the combined stream is raised to at least about 1000 degrees C., (e) rapidly cooling the gas stream now containing NO and (f) recovering the NO formed.

In another of its preferred forms the present invention is a process for the production and recovery of NO from a gas stream prepared by the decomposition of $N_2O$ contained in a gas stream, which comprises (a) heating a first gas stream containing the $N_2O$ to a temperature between about 400 and 700 degrees C. by contacting said $N_2O$ containing stream with a heated heat-exchange surface, (b) injecting a combustible second gas stream into the first gas stream, (c) igniting the combustible second gas stream as it is injected directly into the first gas stream thereby heating the entire combined steam to a temperature of a least 850 degrees C. at which temperature the $N_2O$ in the combined stream decomposes spontaneously and exothermally to form NO, $N_2$, and $O_2$, and the temperature of the combined stream is raised to at least 1000 degrees C. (d) rapidly cooling the gas stream now containing NO and (e) recovering the NO formed.

The process of the invention preheats the $N_2O$ containing gas stream to a temperature just below the temperature at which it decomposes spontaneously and exothermally to form NO, nitrogen and oxygen. Then the off-gas is passed to a decomposition zone where it is heated to the temperature at which it decomposes. By preheating, only a small amount of heating is necessary to raise the temperature above the decomposition temperature, and only a small amount of dilution takes place.

BRIEF DESCRIPTION OF THE DRAWINGS

The Figure is a view, partially in cross-section, of a concentric feed tube arrangement illustrating one arrangement for feeding the preheated $N_2O$ containing off-gas and the combustible gas to the reactor.

DETAILED DESCRIPTION OF THE INVENTION

The off-gas is preferably preheated by passing it through a heat exchanger that is heated by at least a portion of the gas stream from the reactor. The heat exchanger can be made of corrosion resistant materials that are capable of resisting high temperatures, for example 310 stainless steel, Inconel, alumina or silicon carbide.

After the off-gas is preheated it is passed to a reactor. A preferred arrangement for feeding the off-gas and second gas stream, i.e. the combustible gas stream that when combusted raises the temperature of the combined stream to above the temperature at which the $N_2O$ decomposes, is shown in the figure, and comprises concentric feeding tubes, where the outer tube 1 contains the off-gas, and the inner tube 2 the combustible gas. The combustible gas is ignited, for example by an electric spark, at point 3 where the tubes enter the reactor.

EXAMPLE

A gas feed mixture, similar to that produced in the manufacture of adipic acid by nitric acid oxidation of cyclohexanone and cyclohexanol, was prepared by continuously mixing component gases in the quantities shown below:

| Component Gas | Flow (SCFM) | Mole % |
|---|---|---|
| $N_2O$ | 11.4 | 57.0 |
| $N_2$ | 7.0 | 35.0 |
| $O_2$ | 0.5 | 2.5 |
| $CO_2$ | 0.7 | 3.5 |
| $H_2O$ | 0.4 | 2.0 |

The mixed gas feed was heated to 660 degrees C. in a counter-flow shell and tube heat exchanger. This preheater was methane fired in this example, but in a preferred embodiment would be designed for interchange of heat with reactor product gases in the plant scale unit to minimize energy consumption. The preheater had a tubing matrix consisting of 49¼ in. 310 stainless steel tubes. Each tube was 8 ft. in length, with an inside diameter of 0.15 in. Combustion products from the methane flame passed through the shell side of the exchanger, counter to the reactor feed gas flow. The preheater heat load was 300,000 BTU/hr. with a total stoichiometry of 2.2. Maximum combustion gas temperature was 880 degrees C. on the shell side to avoid hot spots which might prematurely initiate $N_2O$ decomposition.

Preheated mixed gas feed at 660 degrees C. was fed to a refractory lined reactor vessel at a pressure of 3 atm. The hot feed gas entered the reactor through a 1 in. opening into a mixing tee. At the mixing tee, the feed gas was mixed directly with hot combustion products from a methane flame in order to increase the feed temperature above ca. 850 degrees C. and initiate exothermic decomposition of $N_2O$. A temperature of 1050 degrees C. was measured with a type b thermocouple in this mixing tee, indicating initiation of the desired $N_2O$ decomposition reaction. The combustion chamber for the initiating fuel was 3.5 in. in diameter, necking down to ¾ in. in diameter at the mixing tee. The initiation flame load was 30,000 BTU/hr. at a primary stoichiometry of 1.05. The initiation burner was designed to allow complete methane combustion and allow the combustion products to reach equilibrium before mixing with the feed gas.

Downstream of the mixing tee, rapid mixing of the preheated feed gas and the initiation burner gas in a mixing chamber 1.5 in I.D. by 13 in. in length promoted rapid decomposition of $N_2O$ to $N_2$, $O_2$, and the desired NO product. A temperature of 1254 degrees C. was measured at the exit of the mixing chamber, indicating that nearly complete reaction had occurred. Downstream of the mixing chamber the reactor inner diameter increased from 1.5 in. to 5 in. This final reaction zone had a total length of 79 in. to the reactor exit. Immediately at the reactor exit the hot gases passed into an indirectly cooled quench zone to avoid NO losses. The product gas stream composition was continuously monitored at the reactor outlet. The product gas composition was measured to be:

| Component Gas | Mole % |
|---|---|
| $N_2O$ | less than 200 ppm |
| NOx | 5.9 |
| $O_2$ | 19.2 |
| $CO_2$ | 4.0 |
| $H_2O$ | 4.7 |
| $N_2$ | 66.2 |

CONTEMPLATED EXAMPLE 1:

A total of 0.5–1 million SCFH waste offgas mixture is produced in a commercial process for the manufacture of adipic acid by nitric acid oxidation of cyclohexanone and cyclohexanol. The offgas temperature is 35 degrees C. and the pressure is ca. 2 atm. The offgas has a typical composition as shown below:

| Component Gas) | Mole % |
|---|---|
| $N_2O$ | 30.5 |
| NOx | 0.7 |
| $CO_2$ | 6.0 |
| CO | 0.03 |
| $O_2$ | 3.9 |
| $H_2O$ | 2.0 |
| $N_2$ | 57.0 |
| VOC* | 0.03 |

*volatile organic carbonaceous compounds

The offgas mixture would be compressed, using standard gas compression equipment, to a pressure of ca. 5 atm. and its temperature would rise to ca. 250 degrees C. due to compression. The offgas would then be passed into a standard interchanger to allow indirect recovery of heat from the quenched flame reactor effluent gases, and to produce a final preheat temperature of ca. 700 degrees C. (During start-up the interchanger would be heated by another heat source, for example burning natural gas.)

Preheated offgas feed at 700 degrees C. would be fed to a refractory lined reactor vessel at a pressure of 4–5 atm. The hot feed gas would enter the reactor through a burner pipe arranged to facilitate plug flow contacting with hot combustion products from a separate methane fired burner. At the mixing device, the feed gas would be mixed directly with hot combustion products from the separate burner in order to increase the feed temperature to ca. 950 degrees C. and initiate exothermic decomposition of $N_2O$. The separate methane burner would be designed to allow complete methane combustion and allow the combustion products to reach equilibrium before mixing with the feed offgas. The refractory lined plug flow reaction chamber would be designed to provide a residence time of ca. 0.05–0.2 sec for the mixing and complete decomposition of the contained $N_2O$.

Downstream of the mixing point, rapid mixing of the preheated feed gas and the initiation burner gas in the plug flow reaction chamber would promote rapid decomposition of $N_2O$ to $N_2$, $O_2$, and the desired NO product. A temperature of up to about 1500 degrees C. could develop due to the exothermic $N_2O$ decomposition. The outlet product gas would be expected to contain at least 0.15 moles of NO per mole of $N_2O$ fed. To avoid thermal losses of the produced NO, the flame reactor effluent gases would be immediately mixed and quenched with a cooler gas stream, for example with a gas stream exiting an ammonia oxidation NO formation reaction system to reduce the quenched gas temperature to ca. 750 degrees C. Such a quench gas might have a temperature of 450 degrees C. and also contains NO at a level of ca. 10 mole The quenched flame reactor effluent gases would be passed into the feed preheat interchanger, as described previously, to preheat the initial offgas feed to the flame reactor, and recover heat from the exothermic $N_2O$ decomposition reaction. Additional energy could be recovered from the flame reactor effluent gases exit the interchanger by installation of a standard steam generation device. The mixed effluent gases would then be cooled and fed to an NO absorption tower, along with contained oxygen and a countercurrent water stream to absorb and convert NO to desired $HNO_3$. Recovered $HNO_3$ would be reused in the manufacture of adipic acid.

CONTEMPLATED EXAMPLE 2:

A total of 0.5–1 million SCFH waste offgas mixture is produced in a commercial process for the manufacture of adipic acid by nitric acid oxidation of cyclohexanone and cyclohexanol. The offgas temperature is 35 degrees C. and the pressure is ca. 2 atm. The offgas has a typical composition as shown below:

| Component Gas | Mole % |
| --- | --- |
| $N_2O$ | 30.5 |
| NOx | 0.7 |
| $CO_2$ | 6.0 |
| CO | 0.03 |
| $O_2$ | 3.9 |
| $H_2O$ | 2.0 |
| $N_2$ | 57.0 |
| VOC* | 0.03 |

*volatile organic carbonaceous compounds

The offgas mixture would be compressed, using standard gas compression equipment, to a pressure of ca. 5 atm. and its temperature would rise to ca. 250 degrees C. due to compression. The offgas would then be passed into a standard interchanger to allow indirect recovery of heat from the quenched flame reactor effluent gases, and to produce a final preheat temperature of ca. 700 degrees C.

Preheated offgas feed at 700 degrees C. would be fed to a refractory lined reactor vessel at a pressure of 4–5 atm. The hot feed gas would enter the reactor through a burner pipe arranged to facilitate plug flow contacting with a direct flame produced by a standard methane fired burner. At the mixing point, the feed gas would be contacted and mixed directly with the flame and hot combustion products from the integral burner in order to increase the feed temperature to ca. 950 degrees C. and initiate exothermic decomposition of $N_2O$. The refractory lined plug flow reaction chamber would be designed to provide a residence time of ca. 0.05–0.2 sec for the mixing and complete decomposition of the contained $N_2O$.

Downstream of the mixing point, rapid mixing of the preheated feed gas and the integral burner gas in the plug flow reaction chamber would promote rapid decomposition of $N_2O$ to $N_2$, $O_2$, and the desired NO product. A temperature of up to about 1500 degrees C. could develop due the the exothermic $N_2O$ decomposition. The outlet product gas would be expected to contain at least 0.15 moles of NO per mole of $N_2O$ fed. To avoid thermal losses of the produced NO, the flame reactor effluent gases would be immediately mixed and quenched with a cooler gas stream, for example with a gas stream exiting an ammonia oxidation NO formation reaction system to reduce the gas temperature to ca. 750 degrees C. Such a quench gas might have a temperature of 450 degrees C. and also contains NO at a level of ca. 10 mole %.

The quenched flame reactor effluent gases would be passed into the feed preheat interchanger, as described previously, to preheat the initial offgas feed to the flame reactor, and recover heat from the exothermic $N_2O$ decomposition reaction. Additional energy could be recovered from the flame reactor effluent gases exit the interchanger by installation of a standard steam generation device. The mixed effluent gases would then be cooled and fed to an NO absorption tower, along with contained oxygen and a countercurrent water stream to absorb and convert NO to desired $HNO_3$. Recovered $HNO_3$ would be reused in the manufacture of adipic acid.

We claim:

1. A process for the production and recovery of NO from a gas stream prepared by the decomposition of $N_2O$ contained in a gas stream, which comprises (a) heating a first gas stream containing the $N_2O$ to a temperature between about 400 and 700 degrees C. by contacting said $N_2O$ containing stream with a heated heat-exchange surface, (b) then passing the stream into a zone where is it out of contact with a heated heat-exchange surface while raising the stream temperature to about 850 degrees C., by combining the stream with a heated second gas stream or by injecting and combusting a combustible gas in the stream, (c) decomposing the $N_2O$ in the stream spontaneously and exothermally to form NO, $N_2$ and $O_2$, while the temperature in the stream is raised to at least about 1000 degrees C., (d) rapidly cooling the gas stream now containing NO and (e) recovering the NO formed.

2. A process for the production and recovery of NO from a gas stream prepared by the decomposition of $N_2O$ contained in a gas stream, which comprises (a) heating a first gas stream containing the $N_2O$ to a temperature between about 400 and 700 degrees C. by contacting said $N_2O$ containing stream with a heated heat-exchange surface, (b) combusting a combustible second gas stream, (c) then combining the first and second gas streams in a zone where the combined stream is out of contact with a heated heat-exchange surface, the temperature and volume of the second gas stream being sufficient to raise the temperature of the combined stream to 850 degrees C., (d) decomposing the $N_2O$ in the combined stream spontaneously and exothermally to form NO, $N_2$ and $O_2$, while the temperature in the combined stream is raised to at least about 1000 degrees C., (e) rapidly cooling the gas stream now containing NO and (f) recovering the NO formed.

3. A process for the production and recovery of NO from a gas stream prepared by the decomposition of $N_2O$ contained in a gas stream, which comprises (a) heating a first gas stream containing the $N_2O$ to a temperature between about 400 and 700 degrees C. by contacting said $N_2O$ containing stream with a heated heat-exchange surface, (b) injecting a combustible second gas stream into the first gas stream, (c) igniting the combustible second gas stream as it is injected directly into the first gas stream thereby heating the entire combined steam to a temperature of a least 850 degrees C.

at which temperature the $N_2O$ in the combined stream decomposes spontaneously and exothermally to form NO, $N_2$, and $O_2$, and the temperature of the combined stream is raised to at least about 1000 degrees C. (d) rapidly cooling the gas stream now containing NO and (e) recovering the NO formed.

4. The process of claim 1 in which the heat exchange surface is metallic and in which the heat exchange surface is heated by contact with a portion of the gas stream formed by decomposing the $N_2O$.

5. The process of claim 2 which all gas streams are at a pressure of between 1 and 6 atmospheres.

6. The process of claim 2 in which the combustible second gas stream contains a hydrocarbon gas.

7. The process of claim 6 in which the hydrocarbon gas is methane.

* * * * *